United States Patent
Nishiguchi et al.

(10) Patent No.: US 6,503,629 B2
(45) Date of Patent: Jan. 7, 2003

(54) CATIONIC COATING COMPOSITION

(75) Inventors: Shigeo Nishiguchi, Hiratsuka (JP); Koji Kamikado, Yokohama (JP); Tadayoshi Hiraki, Odawara (JP); Akira Tominaga, Chigasaki (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 23 days.

(21) Appl. No.: 09/742,387

(22) Filed: Dec. 22, 2000

(65) Prior Publication Data

US 2001/0012564 A1 Aug. 9, 2001

(30) Foreign Application Priority Data

Dec. 22, 1999 (JP) ............................................ 11-363815
Jan. 28, 2000 (JP) ....................................... 2000-019517

(51) Int. Cl.⁷ ............................................... B32B 27/38
(52) U.S. Cl. ....................... 428/413; 428/414; 428/415; 428/416; 428/417; 428/418; 525/423; 525/438; 528/111; 528/114; 528/121; 528/291; 528/341; 528/361; 528/407; 523/417; 523/420
(58) Field of Search .................... 428/413, 414–418; 525/423, 436; 528/111, 114, 121, 291, 341, 361, 407; 523/417, 420

(56) References Cited

U.S. PATENT DOCUMENTS

| | | | | |
|---|---|---|---|---|
| 3,203,920 A | | 8/1965 | Nikles et al. | 524/110 |
| 4,396,649 A | * | 8/1983 | Bailey | 427/386 |
| 5,095,051 A | * | 3/1992 | Chung | 523/417 |
| 5,298,148 A | | 3/1994 | Yasuoka et al. | 205/50 |

OTHER PUBLICATIONS

Patent Abstracts of Japan vol. 2000, No. 01, Jan. 31, 2000 & JP 11 286631 A (Mazda Motor Corp; Nippon Paint Co. Ltd.), Oct. 19, 1999.

* cited by examiner

*Primary Examiner*—Leszek Kiliman
(74) *Attorney, Agent, or Firm*—Wenderoth, Lind & Ponack, L.L.P.

(57) ABSTRACT

The present invention provides a cationic coating composition capable of forming a coating film which is excellent in a corrosion resistance and an adhesive property and an electrodepositably coating property toward a rust preventive steel plate (zinc-plated steel plate). The cationic coating composition described above comprises as a vehicle component, a polyol-modified, amino group-containing epoxy resin prepared by reacting an epoxy resin (A) having an epoxy equivalent of 180 to 2500 with a polyol compound (B) obtained by adding caprolactone to a compound having plural active hydrogen groups and an amino group-containing compound (C).

18 Claims, No Drawings

CATIONIC COATING COMPOSITION

The present invention relates to a cationic coating composition, more specifically to a cationic coating composition capable of forming a cured coating film which is excellent in a corrosion resistance and a rust preventive steel plate aptitude.

A cationic coating composition is used mainly as an electrodepositable coating composition for wide-ranged uses including an undercoating composition for car bodies, and those having various characteristics have so far been developed. Proposed as a conventional cationic coating composition is, for example, a coating composition having an excellent corrosion resistance and improved in an electrodepositable coating aptitude and an adhesive property toward a rust preventive steel plate, in which used as a vehicle component is a modified epoxy resin obtained by internally plasticizing an epoxy resin having an amino group and/or a quaternary ammonium salt group as a hydrophilic group with a plasticizer, for example, a lead compound or a chromium compound such as polyamide, polyester and polyether and blended is a rust preventive pigment such as lead chromate, basic lead silicate and strontium chromate. In recent years, however, hazardous compounds such as lead compounds and chromium compounds are restricted in use thereof from a viewpoint of pollution problems, and techniques which can improve a corrosion resistance of the coating film without blending such hazardous compounds are expected to be developed.

On the other hand, an epoxy resin which is internally plasticized with a plasticizer tends to reduce a corrosion resistance of the coating film, and therefore it is considered to use an epoxy resin containing no plasticizing modifier to thereby elevate the corrosion resistance. However, this provides the problem that the electrodepositable coating aptitude against a rust preventive steel plate is reduced. In order to solve such problems, it is proposed that added as a plasticizer for an epoxy resin are, for example, polyol resins such as polyesterpolyols, polyetherpolyols, polyurethanepolyols and acrylpolyols; and polymers including polyolefins such as polybutadiene and polyethylene. Involved therein, however, is the problem that these materials not only do not have a sufficiently high compatibility with epoxy resins and are not effective so much for elevating a rust preventive steel plate aptitude but also reduce a corrosion resistance of the coating film by adding in a large amount.

An object of the present invention is to provide a cationic coating composition comprising an epoxy resin as a base material and capable of forming a coating film which is excellent both in a corrosion resistance and a rust preventive steel plate aptitude without using hazardous compounds such as lead compounds and chromium compounds.

Intensive researches repeated by the present inventors have resulted in finding that the object described above can be achieved by using as a vehicle component in a cationic coating composition, a polyol-modified, amino group-containing epoxy resin prepared by reacting an epoxy resin with a polyol compound obtained by adding caprolactone to a compound having plural active hydrogen groups and an amino group-containing compound, and they have come to complete the present invention.

Thus, the present invention provides a cationic coating composition comprising as a vehicle component, a polyol-modified, amino group-containing epoxy resin prepared by reacting an epoxy resin (A) having an epoxy equivalent of 180 to 2500 with a polyol compound (B) obtained by adding caprolactone to a compound having plural active hydrogen groups and an amino group-containing compound (C).

The cationic coating composition of the present invention shall be explained below in further details.

Epoxy Resin (A)

An epoxy resin obtained by the reaction of a polyphenol compound with epihalohydrin, for example, epichlorohydrin is particularly suited as an epoxy resin used as a starting material in the production of the modified epoxy resin used as the vehicle component in the coating composition of the present invention from a corrosion resistance of the coating film.

The polyphenol compounds which can be used for producing the above epoxy resin include, for example, bis(4-hydroxyphenyl)-2,2-propane (bisphenol A), 4,4-dihydroxybenzophenone, bis(4-hydroxyphenyl)methane (bisphenol F), bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, tetra-(4-hydroxyphenyl)-1,1,2,2-ethane, 4,4-dihydroxydiphenylsulfone (bisphenol S), phenol novolak and cresol novolak.

Particularly suited as the epoxy resin obtained by the reaction of a polyphenol compound with epihalohydrin is a compound derived from bisphenol A, which is represented by the following formula:

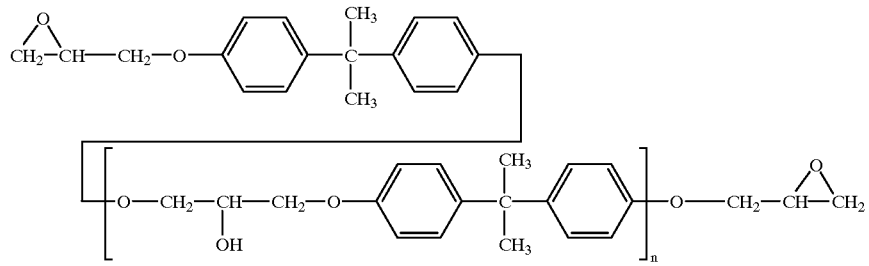

wherein n is 1 to 3.

The epoxy resin (A) can have an epoxy equivalent falling in a range of usually 180 to 2500, preferably 200 to 2000 and more preferably 400 to 1500. Further, it has suitably a number average molecular weight falling in a range of usually at least 200, particularly 400 to 4000 and more particularly 800 to 2000.

Commercially available products of such epoxy resin include, for example, products which are marketed from Oil Shell Epoxy Co., Ltd. in the trade names of Epikote 828EL, ditto 1002, ditto 1004 and ditto 1007.

Polyol Compound (B)

In the present invention, the polyol compound (B) is used for internally plasticizing (modifying) the epoxy resin (A)

described above and is produced by adding caprolactone (b) to a compound (a) having plural active hydrogen groups.

An active hydrogen group means an atomic group containing at least one active hydrogen and includes, for example, an alcoholic hydroxyl group, a primary amino group and a secondary amino group. The compound (a) having plural groups of such active hydrogen group in a molecule includes, for example:

(i) low molecular weight polyols,
(ii) linear or branched polyetherpolyols,
(iii) linear or branched polyesterpolyols,
(iv) amine compounds having a primary amino group and/or a secondary amino group or hydroxylamine compounds having a primary amino group and/or a secondary amino group in combination with a hydroxyl group.

These active hydrogen group-containing compounds (a) can have a number average molecular weight falling in a range of usually 62 to 5,000, preferably 62 to 4,000 and more preferably 62 to 1,500. The active hydrogen group-containing compound (a) is suitably a compound having at least two groups and less than 30 groups, particularly 2 to 10 groups of the active hydrogen groups per molecule on the average.

The low molecular weight polyol (i) described above is a compound having at least two alcoholic hydroxyl groups in a molecule, and to be specific, it includes, for example, diols such as ethylene glycol, propylene glycol, 1,3-butylene glycol, 1,4-butanediol, 1,6-hexanediol, diethylene glycol, dipropylene glycol, cyclohexane-1,4-dimethylol, neopentyl glycol triethylene glycol and hydrogenated bisphenol A; triols such as glycerin, trimethylolethane and trimethylolpropane; tetrols such as pentaerythritol and α-methylglycoside; hexols such as sorbitol and dipentaerythritol; and octols such as sucrose.

The linear or branched polyetherpolyol (ii) described above can have a number average molecular weight falling in a range of usually 62 to 10,000, preferably 62 to 2,000, and to be specific, it includes, for example, polyethylene glycol, polypropylene glycol, polytetramethylene glycol, poly(ethylene.propylene) glycol, bisphenol A ethylene glycol ether and bisphenol A propylene glycol ether which are produced by ring-opening reaction of alkylene oxides (e.g., ethylene oxide, propylene oxide, butylene oxide and tetrahydrofuran).

The linear or branched polyesterpolyol (iii) described above can have a number average molecular weight falling in a range of usually 200 to 10,000, preferably 200 to 3,000, and to be specific, it includes, for example, compounds obtained by polycondensation reaction of organic dicarboxylic acids or anhydrides thereof with organic diols on the condition of organic diol excess. The organic dicarboxylic acid used in this case includes aliphatic, alicyclic or aromatic organic dicarboxylic acids having 2 to 44 carbon atoms, particularly 4 to 36 carbon atoms, for example, succinic acid, adipic acid, azelaic acid, sebacic acid, maleic acid, fumaric acid, glutaric acid, hexachloroheptane-dicarboxylic acid, cyclohexanedicarboxylic acid, o-phthalic acid, isophthalic acid, terephthalic acid, tetra-hydrophthalic acid and tetrachlorophthalic acid. Further, in addition to these carboxylic acids, capable of being used in combination in small amounts are anhydrides of polycarboxylic acids having 3 or more carboxyl groups and adducts of unsaturated fatty acids.

The organic diol component includes, for example, alkylene glycols such as ethylene glycol, propylene glycol, butylene glycol, 1,4-butanediol, 1,6-hexanediol, and neopentyl glycol, and dimethylol-cyclohexane. They may be used, if necessary, in combination with a small amount of polyol such as trimethylolpropane, glycerin and pentaerythritol.

The preceding amine compound having a primary amino group and/or a secondary amino group or amine compound (iv) having a primary amino group and/or a secondary amino group in combination with a hydroxyl group includes, for example, alkyl-amines such as butylenediamine, hexamethylenediamine, tetra-ethylene-pentamine and pentaethylenehexamine; alkanolamines such as monoethanolamine, diethanolamine, triethanolamine, mono-(2-hydroxypropyl)amine and di(2-hydroxypropyl)amine; alicyclic polyamines such as 1,3-bisaminomethyl-cyclohexane and isophoronediamine; aromatic polyamines such as xylylenediamine, metaxylenediamine, diamino-diphenylmethane and phenylene-diamine; alkylenepolyamines such as ethylenediamine, propylene-diamine, diethylene-triamine and triethylenetetramine; and other amine compounds such as polyamides and polyamideamines which are derived from piperizine and these polyamines, amine adducts with epoxy compounds, ketimines and aldimines. Among the compounds (a) having plural active hydrogen groups described above, suited are the compounds of (i), (ii), (iii) and (iv), particularly compounds selected from the group consisting of ethylene glycol, propylene glycol, 1,4-butanediol, 1,6-hexanediol, diethylene glycol, hydrogenated bisphenol A, glycerin, trimethylolethane, trimethylolpropane, pentaerythritol, dipentaerythritol, polyethylene glycol, polypropylene glycol, polytetramethylene glycol, poly(ethylene.propylene) glycol, bisphenol A ethylene glycol ether, bisphenol A propylene glycol ether, butylenediamine, hexamethylene-diamine, monoethanolamine, diethanolamine, triethanolamine, isophoronediamine, ethylene-diamine, propylene-diamine, diethylenetriamine and triethylene-tetramine.

On the other hand, the caprolactone (b) which can be added to the compound (a) having plural active hydrogen groups includes γ-caprolactone, ε-caprolactone and δ-caprolactone, and ε-caprolactone is particularly suited.

The addition reaction of the compound (a) having plural active hydrogen groups and the caprolactone (b) described above can be carried out by conventionally known methods. To be specific, it can be carried out, for example, by heating the compound (a) having plural active hydrogen groups and the caprolactone (b) at a temperature of about 100 to about 250° C. for about one to about 15 hours in the presence of a catalyst including titanium compounds such as tetrabutoxytitanium and tetrapropoxytitanium, organic tin compounds such as tin octylate, dibutyltin oxide and dibutyltin laurate, and metal compounds such as stannous chloride.

In general, the catalyst described above can be used in an amount of 0.5 to 1,000 ppm based on the total amount of the compound (a) having plural active hydrogen groups and the caprolactone (b). The caprolactone (b) can be used in an amount falling in a range of usually 1 to 30 moles, preferably 1 to 20 moles and more preferably 1 to 15 moles per equivalent (that is, per hydrogen group) of the hydrogen group of the compound (a) having plural active hydrogen groups.

The polyol compound (B) thus obtained has together a high plasticizing performance based on the compound (a) having plural active hydrogen groups, a high compatibility with an epoxy resin based on (poly)caprolactone and a high reactivity attributable to a terminal hydroxyl group and therefore is very useful as an internal plasticizer for an epoxy resin for a coating material.

The polyol compound (B) can be added in a proportion falling in a range of usually 20 to 95% by weight, preferably 25 to 90% by weight in terms of the total of units originating in the caprolactone (b). Also, it can have a number average molecular weight falling in a range of usually 300 to 10,000, preferably 400 to 5,000.

Amino Group-containing Compound (C)

In the present invention, the amino group-containing compound (C) which is reacted with the epoxy resin (A) is a cationic property-providing component used for introducing an amino group into an epoxy resin base substance to make the above epoxy resin cationic, and the compounds having at least one active hydrogen reacting with an epoxy group are used.

The amino group-containing compound used for such purpose includes mono- or di-alkylamines such as monomethylamine, dimethylamine, monoethylamine, diethylamine, monoisopropylamine, diisopropylamine, triisopropylamine, monobutylamine and dibutylamine; alkanolamines such as monoethanolamine, diethanolamine, mono(2-hydroxypropyl)amine, di(2-hydroxypropyl)amine, tri(2-hydroxypropyl)amine, monomethylaminoethanol and mono-ethylaminoethanol; alkylenepolyamines such as ethylenediamine, propylenediamine, butylenediamine, hexamethylenediamine, tetra-ethylenepentamine, pentaethylenehexamine, diethylaminopropylamine, diethyelenetriamine and triethylenetetramine, and ketimine-reduced compounds of these polyamines; alkyleneimines such as ethyleneimine and propyleneimine; and cyclic amines such as piperazine, morpholine and pyridine.

Polyol-modified, Amino Group-containing Epoxy Resin

The polyol-modified, amino group-containing epoxy resin used as a vehicle in the coating composition of the present invention can be produced by addition-reacting the polyol compound (B) having a terminal hydroxyl group originating in caprolactone and the amino group-containing compound with the epoxy resin (A) described above by a conventionally known method. The reaction of the polyol compound (B) and the amino group-containing compound (C) with the epoxy resin (A) can be carried out in an optional order. In general, the polyol compound (B) and the amino group-containing compound (C) are suitably reacted with the epoxy resin (A) at the same time. A single end of the polyol compound (B) is preferably added to a skeleton of the epoxy resin (A).

The addition reaction thereof can be carried out usually in a suitable solvent at a temperature of about 90 to about 170° C., preferably about 100 to about 150° C. for one to 5 hours, preferably 2 to 4 hours. The solvent described above includes, for example, hydrocarbons such as toluene, xylene and n-hexane; esters such as methyl acetate, ethyl acetate and butyl acetate; ketones such as acetone, methyl ethyl ketone, methyl isobutyl ketone and methyl amyl ketone; amides such as dimethylformamide and dimethylacetamide; alcohols such as methanol, ethanol, n-propanol and iso-propanol; and mixtures thereof.

The use proportions of the respective reaction components in the addition reaction described above shall not strictly be restricted and can suitably be changed according to uses of the coating composition. The epoxy resin (A), the polyol compound (B) and the amino group-containing compound (C) fall suitably in the following ranges based on the total solid matter weight of the three components described above:

Epoxy resin (A)
usually 60 to 90% by weight, preferably 62 to 85% by weight and more preferably 62 to 80% by weight Polyol compound (B)
usually 5 to 30% by weight, preferably 5 to 20% by weight and more preferably 5 to 18% by weight Amino group-containing compound (C)
usually 5 to 25% by weight, preferably 6 to 19% by weight and more preferably 6 to 18% by weight Cationic Coating Composition The cationic coating composition provided by the present invention comprises as a vehicle, the polyol-modified, amino group-containing epoxy resin produced in the manner described above and is suitably used in water base coating materials, particularly electro-depositable coating materials.

The cationic coating composition according to the present invention is used in combination with, for example, a cross-linking agent such as blocked polyisocyanate and a melamine resin, particularly a blocked polyisocyanate cross-linking agent, whereby a thermosetting cationic coating composition can be prepared.

The blocked polyisocyanate cross-linking agent described above is an addition reaction product of a polyisocyanate compound with an isocyanate blocking agent in almost stoichiometric amounts. The polyisocyanate compound used in this case includes, for example, aromatic, aliphatic or alicyclic polyisocyanate compounds such as tolylenediisocyanate, xylilenediisocyanate, phenylenediisocyanate, bis(isocyanatemethyl)cyclohexane, tetramethylenediisocyanate, hexamethylenediisocyanate, methylenediisocyanate and isophoronediisocyanate, and terminal isocyanate group-containing compounds obtained by reacting excess amounts of these polyisocyanate compounds with low molecular active hydrogen-containing compounds such as ethylene glycol, propylene glycol, trimethylolpropane, hexanetriol and castor oil.

On the other hand, the isocyanate blocking agents described above are added to isocyanate groups of the polyisocyanate compounds to block them, and the blocked polyisocyanate compounds formed by addition thereof are stable at a room temperature. However, when they are heated at a baking temperature (usually, about 100 to about 200° C.) of the coating film, the blocking agent is preferably dissociated, and the free isocyanate groups can be regenerated. The blocking agent satisfying such requisite includes, for example, lactam base compounds such as $\epsilon$-caprolactam and $\gamma$-butyrolactam; oxime base compounds such as methyl ethyl ketoxime and cyclohexanoneoxime; phenol base compounds such as phenol, p-t-butyl-phenol and cresol; aliphatic alcohols such as n-butanol and 2-ethyl-hexanol; aromatic alkylalcohols such as phenylcarbinol and methyl-phenylcarbinol; and ether alcohol base compounds such as ethylene glycol monobutyl ether.

A blending proportion of the polyol-modified, amino group-containing epoxy resin to the blocked polyisocyanate cross-linking agent is, based on the total solid matter weight of these both components, can be allowed to fall in a range of usually 55 to 90% by weight, preferably 60 to 85% by weight and more preferably 60 to 80% by weight in the case of the polyol-modified, amino group-containing epoxy resin and usually 10 to 45% by weight, preferably 15 to 40% by weight and more preferably 20 to 40% by weight in the case of the blocked polyisocyanate cross-linking agent.

The cationic coating composition of the present invention comprising the polyol-modified, amino group-containing epoxy resin and the blocked polyisocyanate cross-linking agent described above can be prepared, for example, by sufficiently mixing the polyol-modified, amino group-containing epoxy resin and the blocked polyisocyanate cross-linking agent and then neutralizing the mixture with water-soluble organic carboxylic acid usually in an aqueous medium to make the above epoxy resin water-soluble or water-dispersible. Acetic acid, formic acid or a mixture thereof is particularly suited as the organic carboxylic acid used for neutralization, and use of these acids elevates a finishing property, a throwing property and a low temperature-curing property of the coating composition formed and a stability of the coating material.

A bismuth compound can be added as a rust preventive to the coating composition of the present invention. The kind of the bismuth compound which can be blended shall not specifically be restricted and includes, for example, inorganic bismuth compounds such as bismuth oxide, bismuth hydroxide, basic bismuth carbonate, bismuth nitrate and bismuth silicate. Among them, bismuth hydroxide is particularly preferred.

Capable of being also used as the bismuth compound are organic acid bismuth salts which are produced by reacting two or more organic acids with the bismuth compounds described above and in which at least one of the above organic acids is aliphatic hydroxycarboxylic acid. The organic acids which can be used for producing the above organic acid bismuth salts include, for example, glycolic acid, glyceric acid, lactic acid, dimethylolpropionic acid, dimethylolbutyric acid, dimethylolvaleric acid, tartaric acid, malic acid, hydroxymalonic acid, dihydroxysuccinic acid, trihydroxysuccinic acid, methylmalonic acid, benzoic acid and citric acid.

The inorganic bismuth compounds and the organic acid bismuth salts described above each can be used alone or may be used in combination of two or more kinds thereof.

A content of these bismuth compounds in the coating composition of the present invention shall not strictly be restricted and can be changed over a wide range according to performances required to the coating material. Usually, it falls suitably in a range of 10% by weight or less, preferably 0.05 to 5% by weight based on the resinous solid matters contained in the coating composition of the present invention.

Further, the coating composition of the present invention can contain, if necessary, a tin compound as a curing catalyst. The above tin compound includes, for example, organic tin compounds such as dibutyltin oxide and dioctyltin oxide; and aliphatic or aromatic carboxylic acid salts of dialkyltin such as dibutyltin dilaurate, dioctyltin dilaurate, dibutyltin diacetate, dioctyltin benzoateoxy, dibutyltin benzoateoxy, dioctyltin dibenzoate and dibutyltin dibenzoate. Among them, dialkyltin aromatic carboxylic acid salts are suitable from a viewpoint of a low temperature curability.

A content of these tin compounds in the coating composition of the present invention shall not strictly be restricted and can be changed over a wide range according to performances required to the coating material. Usually, the tin content falls suitably in a range of 0.01 to 8 parts by weight, preferably 0.05 to 5.0 parts by weight per 100 parts by weight of the resinous solid matters contained in the coating material.

Further, the cationic coating composition of the present invention can be blended, if necessary, with coating material additives such as a color pigment, an extender pigment, a rust preventive pigment, an organic solvent, a pigment dispersant and a surface-controlling agent.

The cationic coating composition of the present invention can be coated on a desired base material surface by cationically electrodepositable coating. In general, electrodepositable coating can be carried out on the condition of a loaded voltage of 100 to 400 V in an electrodepositing bath controlled usually to a bath temperature of about 15 to about 35° C., which comprises the coating composition of the present invention diluted by adding deionized water so that the solid matter concentration becomes about 5.0 to about 40% by weight and controlled to a pH falling in a range of 5.5 to 9.

A film thickness of an electrodeposited coating film which is formed using the coating composition of the present invention shall not specifically be restricted and falls preferably in a range of usually 10 to 40 $\mu$m, particularly 15 to 35 $\mu$m in terms of a cured coating film. A baking temperature of the coating film is suitably a temperature falling in a range of usually about 120 to about 200° C., preferably about 140 to about 180° C. on a coated article surface, and the baking time can be set preferably in an extent of 5 to 60 minutes, preferably 10 to 30 minutes.

The cationic coating composition of the present invention is suitably used as a cationically electrodepositable coating material, but it shall not be restricted thereto and can also be used as a solvent type coating material for a corrosion resistant primer of a steel plate for coating by a method such as electrostatic coating and roll coating.

Further, the coating composition of the present invention can be used as a two liquid type room temperature-drying coating material and an adhesive using a polyisocyanate compound and a melamine resin as a cross-linking agent.

The cationic coating composition of the present invention forms a cured coating film which is excellent in a corrosion resistance, an electrodepositable coating aptitude against a corrosion-resistant steel plate and an adhesive property to a base material and is useful as an undercoating material for car bodies, car parts and construction & building fields.

The present invention shall more specifically be explained below with reference to examples, but the present invention shall by no means be restricted to the examples. "Parts" and "%" show "parts by weight" and "% by weight" respectively.

Production Example 1

Polyol-modified, Amino Group Containing Epoxy Resin

Added to 400 g of PP-400 (trade name, polypropylene glycol having a molecular weight of 400, marketed by Sanyo Chemical Industrial Ltd.) was 300 g of $\epsilon$-caprolactone, and the temperature was elevated up to 130° C. Then, 0.01 g of tetrabutoxytitanium was added, and the temperature was elevated to 170° C. Sampling was carried out with the passage of time while maintaining this temperature to trace an amount of unreacted $\epsilon$-caprolactone by measurement of an infrared absorption spectrum, and the solution was cooled at a point of time when the reaction rate reached 98% or more to obtain a modifying agent 1.

Next, another flask was charged with 1000 g of Epikote 828EL (trade name, an epoxy resin having an epoxy equivalent of 190 and a molecular weight of 350, marketed by Oil Shell Epoxy Co., Ltd.), 400 g of bisphenol A and 0.2 g of dimethylbenzylamine to react them at 130° C. until the epoxy equivalent became 750. Then, added were 200 g of the modifying agent 1, 140 g of diethanolamine and 65 g of a ketimine-reduced product of diethylenetriamine to react them at 120° C. for 4 hours, and then 400 g of butyl cellosolve was added to obtain a resin No. 1 having an amine value of 58 and a resin solid content of 80%.

Production Example 2

Polyol-modified, Amino Group Containing Epoxy Resin

Added to 1000 g of PP-1000 (trade name, polypropylene glycol having a molecular weight of 1000, marketed by Sanyo Chemical Industrial Ltd.) was 300 g of ε-caprolactone, and the temperature was elevated up to 130° C. Then, 0.01 g of tetrabutoxytitanium was added, and the temperature was elevated to 170° C. Sampling was carried out with the passage of time while maintaining this temperature to trace an amount of unreacted ε-caprolactone by measurement of an infrared absorption spectrum, and the solution was cooled at a point of time when the reaction rate reached 98% or more to obtain a modifying agent 2.

Next, the same procedure as in Production Example 1 was carried out to obtain a resin No. 2 having a resin solid content of 80%, except that the modifying agent 2 was substituted for the modifying agent 1.

Production Example 3

Polyol-modified, Amino Group Containing Epoxy Resin

Added to 400 g of PEG-400 (trade name, polyethylene glycol having a molecular weight of 400, marketed by Sanyo Chemical Industrial Ltd.) was 300 g of ε-caprolactone, and the temperature was elevated up to 130° C. Then, 0.01 g of tetrabutoxytitanium was added, and the temperature was elevated to 170° C. Sampling was carried out with the passage of time while maintaining this temperature to trace an amount of unreacted ε-caprolactone by measurement of an infrared absorption spectrum, and the solution was cooled at a point of time when the reaction rate reached 98% or more to obtain a modifying agent 3.

Next, the same procedure as in Production Example 1 was carried out to obtain a resin No. 3 having a resin solid content of 80%, except that the modifying agent 3 was substituted for the modifying agent 1.

Production Example 4

Polyol-modified, Amino Group Containing Epoxy Resin

Added to 400 g of MN-400 (trade name, polypropylene glycol having a molecular weight of 400, marketed by Mitsui Chemical Inc.) was 400 g of ε-caprolactone, and the temperature was elevated up to 130° C. Then, 0.01 g of tetrabutoxytitanium was added, and the temperature was elevated to 170° C. Sampling was carried out with the passage of time while maintaining this temperature to trace an amount of unreacted ε-caprolactone by measurement of an infrared absorption spectrum, and the solution was cooled at a point of time when the reaction rate reached 98% or more to obtain a modifying agent 4.

Next, the same procedure as in Production Example 1 was carried out to obtain a resin No. 4 having a resin solid content of 80%, except that the modifying agent 4 was substituted for the modifying agent 1.

Production Example 5

Polyol-modified, Amino Group Containing Epoxy Resin

Added to 105 g of diethanolamine was 695 g of ε-caprolactone, and the temperature was elevated up to 130° C. Then, 0.01 g of tetrabutoxytitanium was added, and the temperature was elevated to 170° C. Sampling was carried out with the passage of time while maintaining this temperature to trace an amount of unreacted ε-caprolactone by measurement of an infrared absorption spectrum, and the solution was cooled at a point of time when the reaction rate reached 98% or more to obtain a modifying agent 5.

Next, the same procedure as in Production Example 1 was carried out to obtain a resin No. 5 having a resin solid content of 80%, except that the modifying agent 5 was substituted for the modifying agent 1.

Production Example 6

Polyol-modified, Amino Group Containing Epoxy Resin

Added to 103 g of diethylenetriamine was 697 g of ε-caprolactone, and the temperature was elevated up to 130° C. Then, 0.01 g of tetrabutoxytitanium was added, and the temperature was elevated to 170° C. Sampling was carried out with the passage of time while maintaining this temperature to trace an amount of unreacted ε-caprolactone by measurement of an infrared absorption spectrum, and the solution was cooled at a point of time when the reaction rate reached 98% or more to obtain a modifying agent 6.

Next, the same procedure as in Production Example 1 was carried out to obtain a resin No. 6 having a resin solid content of 80%, except that the modifying agent 6 was substituted for the modifying agent 1.

Production Example 7

Polyol-modified, Amino Group Containing Epoxy Resin

Added to 1000 g of Epikote 828EL (trade name, an epoxy resin having an epoxy equivalent of 190 and a molecular weight of 350, marketed by Oil Shell Epoxy Co., Ltd.) were 400 g of bisphenol A and 0.2 g of dimethylbenzylamine to react them at 130° C. until the epoxy equivalent became 750. Next, added were 650 g of the modifying agent 2, 130 g of diethanolamine and 65 g of a ketimine-reduced product of diethylenetriamine to react them at 120° C. for 4 hours, and then 500 g of butyl cellosolve was added to obtain a resin No. 7 having an amine value of 42 and a resin solid content of 80%.

Production Example 8

Amino Group Containing Epoxy Resin

Added to 1010 g of Epikote 828EL (trade name, an epoxy resin, marketed by Oil Shell Epoxy Co., Ltd.) were 390 g of bisphenol A and 0.2 g of dimethylbenzylamine to react them at 130° C. until the epoxy equivalent became 800. Next, added were 160 g of diethanolamine and 65 g of a ketimine-reduced product of diethylenetriamine to react them at 120° C. for 4 hours, and then 355 g of butyl cellosolve was added to obtain a resin No. 8 having an amine value of 67 and a resin solid content of 80%.

Production Example 9

Polyisocyanate-blocked Curing Agent

Added to 270 g of M-200 (trade name, crude MDI, marketed by Mitsui Chemicals Inc.) was 46 g of methyl isobutyl ketone, and the temperature was elevated to 70° C. Slowly added was 280 g of diethylene glycol monoethyl ether, and the temperature was elevated to 90° C. Sampling was carried out with the passage of time while maintaining this temperature to confirm by measurement of an infrared absorption spectrum that absorption of unreacted ε-caprolactone disappeared, whereby a polyisocyanate-blocked curing agent (A) having a solid content of 90% was obtained.

Production of Clear Emulsions (1) Blended and homogeneously stirred were 87.5 g (70 g in terms of the resin solid matter) of the resin No. 1 obtained in Production Example 1 described above, 33.3 g (30 g in terms of the resin solid matter) of the polyisocyanate-blocked curing agent (A) obtained in Production Example 9, 2.5 g of dibutyltin dibenzoate (solid content: 40%) and 15 g of 10% acetic acid, and then 156 g of deionized water was dropwise added in about 15 minutes while vigorously stirring to obtain a clear emulsion (a) for cationic electrodeposition having a solid content of 34%.

Similarly, emulsions (b), (c), (d), (e), (f), (g) and (h) were obtained in combinations of the components shown in Table 1.

(2) Blended and homogeneously stirred were 68.8 g (55.0 g in terms of the resin solid matter) of the resin No. 8 obtained in Production Example 8 described above, 33.3 g (30 g in terms of the resin solid matter) of the polyisocyanate-blocked curing agent (A) obtained in Production Example 9, 15 g of the modifying agent 1 obtained in the middle of Production Example 1, 2.5 g of dibutyltin dibenzoate (solid content: 40%) and 15 g of 10% acetic acid, and then 160 g of deionized water was dropwise added in about 15 minutes while vigorously stirring to obtain a clear emulsion (i) for cationic electrodeposition having a solid content of 34%.

TABLE 1

| Emul- | Example | | | | | | | Comparative Example | |
|---|---|---|---|---|---|---|---|---|---|
| sion name | 1 (a) | 2 (b) | 3 (c) | 4 (d) | 5 (e) | 6 (f) | 7 (g) | 1 (h) | 2 (i) |
| Resin No. 1 | 87.5 | | | | | | | | |
| Resin No. 2 | | 87.5 | | | | | | | |
| Resin No. 3 | | | 87.5 | | | | | | |
| Resin No. 4 | | | | 87.5 | | | | | |
| Resin No. 5 | | | | | 87.5 | | | | |
| Resin No. 6 | | | | | | 87.5 | | | |
| Resin No. 7 | | | | | | | 87.5 | | |
| Resin No. 8 | | | | | | | | 87.5 | 68.8 |
| Modifying agent 1 | | | | | | | | | 15.0 |
| Curing agent A | 33.3 | 33.3 | 33.3 | 33.3 | 33.3 | 33.3 | 33.3 | 33.3 | 33.3 |

Production of Pigment-Dispersed Paste

Added to 5.83 parts of a 60% quaternary epoxy chloride resin, 14.5 parts of titanium white, 0.4 part of carbon black, 7.0 parts of an extender pigment and 2.0 parts of bismuth hydroxide was 2.24 parts of deionized water, and the mixture was sufficiently stirred to obtain a pigment-dispersed paste having a solid content of 55.0%.

EXAMPLES AND COMPARATIVE EXAMPLES

Example 1

Added to 297 parts of the clear emulsion (a) for cationic electrodeposition were 49.8 parts of the pigment-dispersed paste and 235.7 parts of deionized water to obtain a cationically electrodepositable coating material having a solid content of 20%.

Examples 2 to 7 and Comparative Examples 1 and 2

The pigment-dispersed paste and deionized water were added in the same manner as in Example 1 to each of the clear emulsions (b) to (i) for cationic electrodeposition in the same blending proportions as in Example 1 to obtain cationically electrodepositable coating materials having a solid content of 20%.

Coating Test

A zinc-plated steel plate of 0.8×150×70 mm subjected to chemical conversion treatment with Palbond #3020 (trade name, a zinc phosphate treating agent, marketed by Nihon Parkerizing Co., Ltd.) was dipped in the respective cationically electrodepositable coating materials obtained in Examples and Comparative Examples described above to carry out electrodepositable coating using them as a cathode (coating voltage of rust resistant steel plate: 270 V). Electrodeposited coating films thus formed were baked at 170° C. for 20 minutes by means of an electric hot air dryer. The performance test results of the coated plates thus obtained are shown in the following Table 2.

TABLE 2

| Coating film performances | Example | | | | | | | Comparative Example | |
|---|---|---|---|---|---|---|---|---|---|
| | 1 | 2 | 3 | 4 | 5 | 6 | 7 | 1 | 2 |
| Electrodeposition aptitude of rust resistant steel plate(*1) | ◯ | ◯ | ◯ | ◯ | ◯ | ◯ | ◯ | X | X |
| Corrosion resistance(*2) | ◯ | ◯ | ◯ | ◯ | ◯ | ◯ | ◯ | ◯ | Δ |
| Impact resistance(*3) | 50< | 50< | 50< | 50< | 50< | 50< | 50< | 20 | 40 |
| Secondary adhesive property(*4) | ◯ | ◯ | ◯ | ◯ | ◯ | ◯ | ◯ | X | X |
| Bending resistance(*5) | ◯ | ◯ | ◯ | ◯ | ◯ | ◯ | ◯ | X | ◯ |
| Curability(*6) | ◯ | ◯ | ◯ | ◯ | ◯ | ◯ | ◯ | Δ | Δ |

The performance tests were carried out according to the following methods.

(*1) Electrodeposition Aptitude of Rust Resistant Steel Plate

A zinc-plated steel plate used as a cathode was dipped in an electrodepositing bath and coated at a voltage of 270 V and a bath temperature of 28° C. to obtain a test piece, and the number of pin holes in 10×10 cm of the test piece was counted and evaluated according to the following criteria:

○: no pin holes were observed

Δ: 3 to 5 pin holes were observed

×: 10 or more pin holes were observed (*2) Corrosion Resistance

Cross-cut scratches were provided on the electrodeposited coating films of the respective electrodepositably coated plates obtained tained by baking at a temperature of 170° C. for 20 minutes by means of a knife so that it reached the base surface, and they were subjected to a 840 hour salt water-spraying resistant test according to JIS Z-2371 to evaluate a width of rust and blister produced in the cut part according to the following criteria:

○: maximum width of rust and blister is less than 2 mm (one side) from the cut part Δ: maximum width of rust and blister is 2 mm or more and less than 3 mm (one side) from the cut part, and blister is observed to be produced on the whole coated surface ×: maximum width of rust and blister is 3 mm or more from the cut part, and blister was observed to be produced on the whole coated surface (*3) Impact Resistance (Du Pont System)

The test plates obtained by baking at a temperature of 170° C. for 20 minutes were put in a constant temperature and constant humidity chamber having a temperature of 20±1° C. and a humidity of 75±2% for 24 hours. Then, the test plate was interposed between a pedestal and an impact pin each having a prescribed size which were installed to a Du Pont impact tester with the coated face turned upward. Subsequently, a deadweight having a prescribed weight was fallen onto the impact pin to determine a maximum height at which cracking and peeling were not caused.

(*4) Secondary Adhesive Property

TP-37 Grey (trade name, an aminoalkid base intermediate coating material, marketed by Kansai Paint Co., Ltd.) and NEO AMILAC 600 (trade name, an aminoalkid base top coating material, marketed by Kansai Paint Co., Ltd.) were further coated in order on the coated surface of the coated plate obtained in the coating test described above, baked and cured to obtain a coated plate. It was immersed in warm water of 40° C. for 240 hours and then provided with cross-cuts of 2 mm square. Subsequently, it was subjected to a peeling test with a cellophane adhesive tape to evaluate a residual rate (residual cross-cuts/100) of the coating film according to the following criteria:

○: 100/100

Δ: 90 to 99/100

×: not more than 89/100

(*5) Bending Resistance

The test plate was put in a constant temperature and constant humidity chamber having a temperature of 20±1° C. and a humidity of 75±2% for 24 hours and then bent by 180° in 1 to 2 seconds to evaluate both front and back surfaces of a bent part according to the following criteria:

○: nothing unusual was found on both front and back surfaces

×: anything unusual such as cracking and peeling was found on either of them (*6) Curability The coated surfaces of the respective electrodepositably coated plates obtained by baking at a temperature of 170° C. for 20 minutes were rubbed by about 20 reciprocations in a length of about 3 to 4 cm at a pressure of 3.92 mPa (about 4 kg/cm$^2$) with a set of four gauzes soaked with acetone, and then the coated surface appearance was visually observed to evaluate it according to the following criteria:

○: no scratches were observed on the coated surface

Δ: scratches were observed on the coated surface but no base surface was seen

×: coating film was dissolved and base surface was seen.

What is claimed is:

1. A cationic coating composition comprising as a vehicle component, a polyol-modified, amino group-containing epoxy resin prepared by reacting an epoxy resin (A) having an epoxy equivalent of 180 to 2500 with a polyol compound (B) obtained by adding caprolactone to a compound having plural active hydrogen groups and an amino group-containing compound (C), the compound having plural active hydrogen groups being selected from the group consisting of low molecular weight polyols, linear or branched polyetherpolyols, and linear or branched polyesterpolyols.

2. The cationic coating composition as described in claim 1, wherein the epoxy resin (A) is obtained by reacting a polyphenol compound with epihalohydrin.

3. The cationic coating composition as described in claim 2, wherein the polyphenol compound is bisphenol A.

4. The cationic coating composition as described in claim 1, wherein the epoxy resin (A) has an epoxy equivalent falling in a range of 200 to 2000.

5. The cationic coating composition as described in claim 1, wherein the compound having plural active hydrogen groups has a number average molecular weight falling in a range of 62 to 5,000.

6. The cationic coating composition as described in claim 1, wherein the compound having plural active hydrogen groups has at least two groups and less than 30 groups of the active hydrogen groups per molecule on the average.

7. The cationic coating composition as described in claim 1, wherein the compound having plural active hydrogen groups is selected from the group consisting of ethylene glycol, propylene glycol, 1,4-butanediol, 1,6-hexanediol, diethylene glycol, hydrogenated bisphenol A, glycerin, trimethylolethane, pentaerythritol, dipentaerythritol, polyethylene glycol, polypropylene glycol, polytetramethylene glycol, poly(ethylene.propylene)glycol, bisphenol A ethylene glycol ether and bisphenol A propylene glycol ether.

8. The cationic coating composition as described in claim 1, wherein caprolactone is ε-caprolactone.

9. The cationic coating composition as described in claim 1, wherein an added molar amount of caprolactone to the compound having plural active hydrogen groups falls in a range of 1 to 30 moles per equivalent of the active hydrogen group.

10. The cationic coating composition as described in claim 1, wherein the polyol-modified, amino group-containing epoxy resin is obtained by reacting the epoxy resin (A) with the polyol compound (B) and the amino group-containing compound (C) at the same time.

11. The cationic coating composition as described in claim 1, wherein the polyol-modified, amino group-containing epoxy resin is prepared by reacting 60 to 90% by weight of the epoxy resin (A), 5 to 30% by weight of the polyol compound (B) and 5 to 25% by weight of the amino group-containing compound (C) each based on the total solid matter weight of the epoxy resin (A), the polyol compound (B) and the amino group-containing compound (C).

12. The cationic coating composition as described in claim 1, wherein the polyol-modified, amino group-containing epoxy resin is prepared by reacting 62 to 85% by weight of the epoxy resin (A), 5 to 20% by weight of the polyol compound (B) and 6 to 19% by weight of the amino group-containing compound (C) each based on the total solid matter weight of the epoxy resin (A), the polyol compound (B) and the amino group-containing compound (C).

13. The cationic coating composition as described in claim 1, further comprising a blocked polyisocyanate cross-linking agent.

14. The cationic coating composition as described in claim 13, comprising the blocked polyisocyanate cross-linking agent in a proportion falling in a range of 10 to 45% by weight based on the total solid matter weight of the polyol-modified, amino group-containing epoxy resin and the blocked polyisocyanate cross-linking agent.

15. The cationic coating composition as described in claim 1, further comprising a bismuth compound as a rust preventive.

16. A cationically electrodepositing bath comprising the cationic coating composition as described in claim 1.

17. A cationic electrodeposition-coating method which comprises cationically electrodepositing the cationic coating composition as described in claim 1 on a base material surface.

18. An article coated with the cationic coating composition as described in claim 1.

* * * * *